No. 629,384. Patented July 25, 1899.
A. G. MANNS & C. H. McDOWELL.
DRIER.
(Application filed Nov. 3, 1898.)
(No Model.) 3 Sheets—Sheet 3.
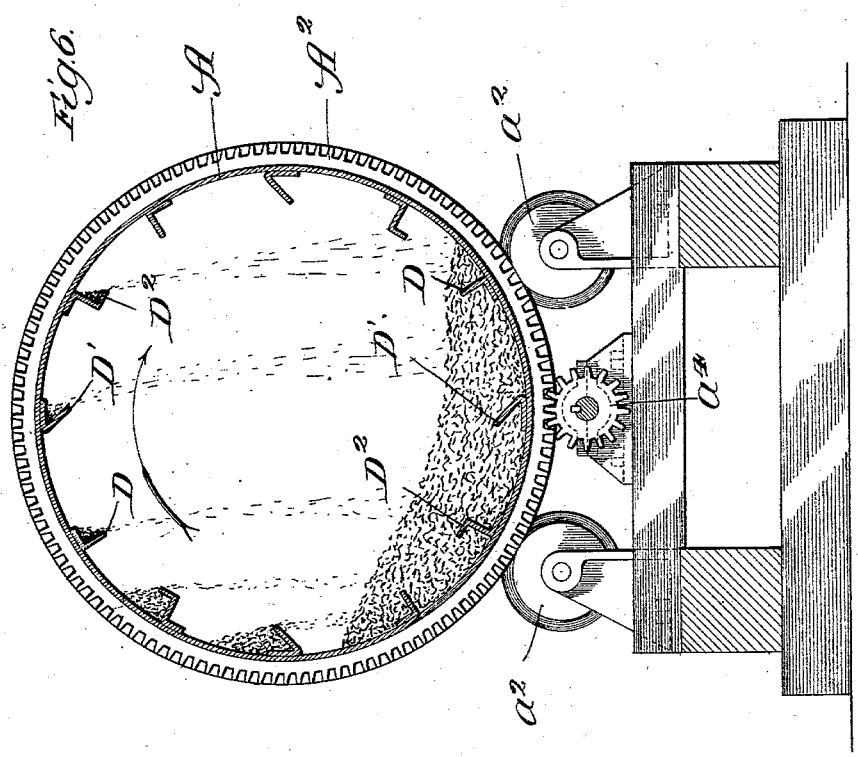
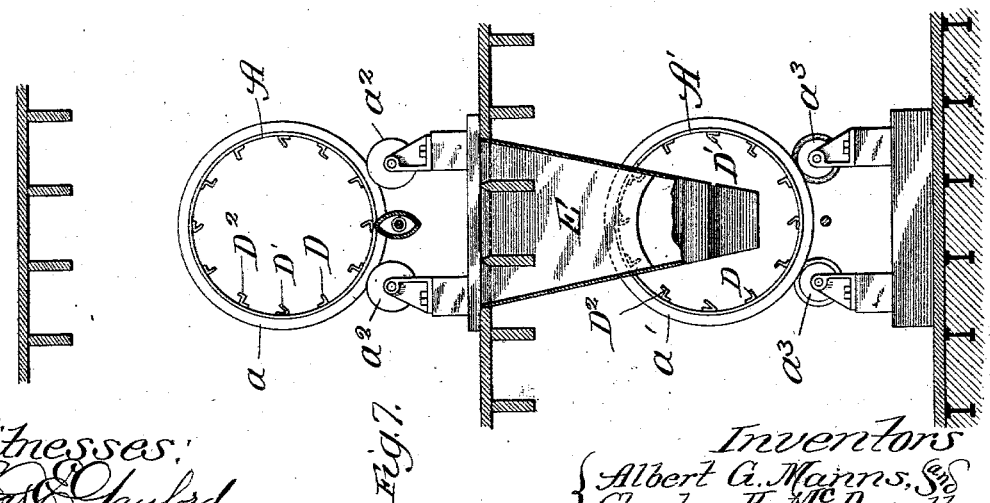
Witnesses:
Inventors
Albert G. Manns,
Charles H. McDowell,
By Banning & Banning & Sheridan,
Attys

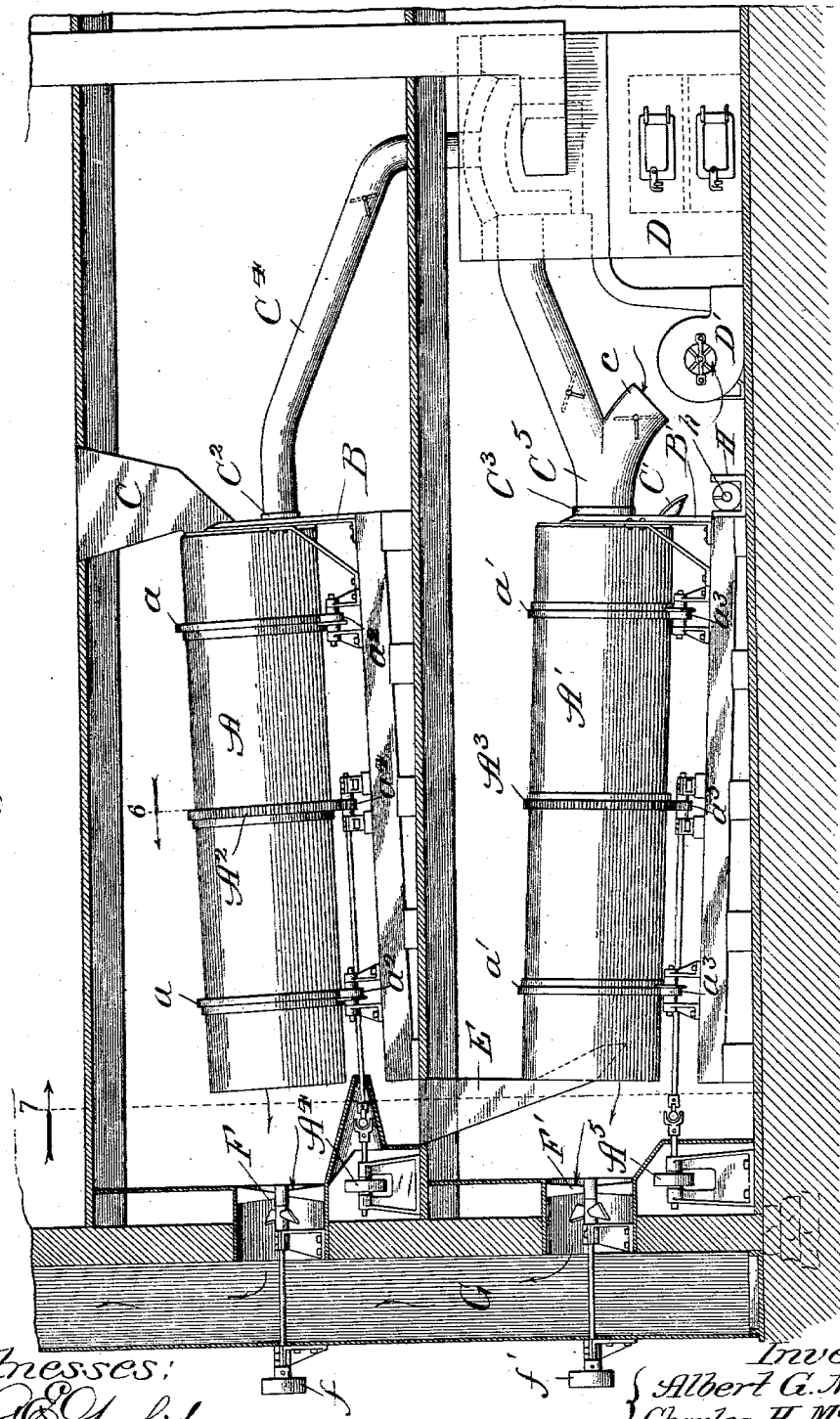

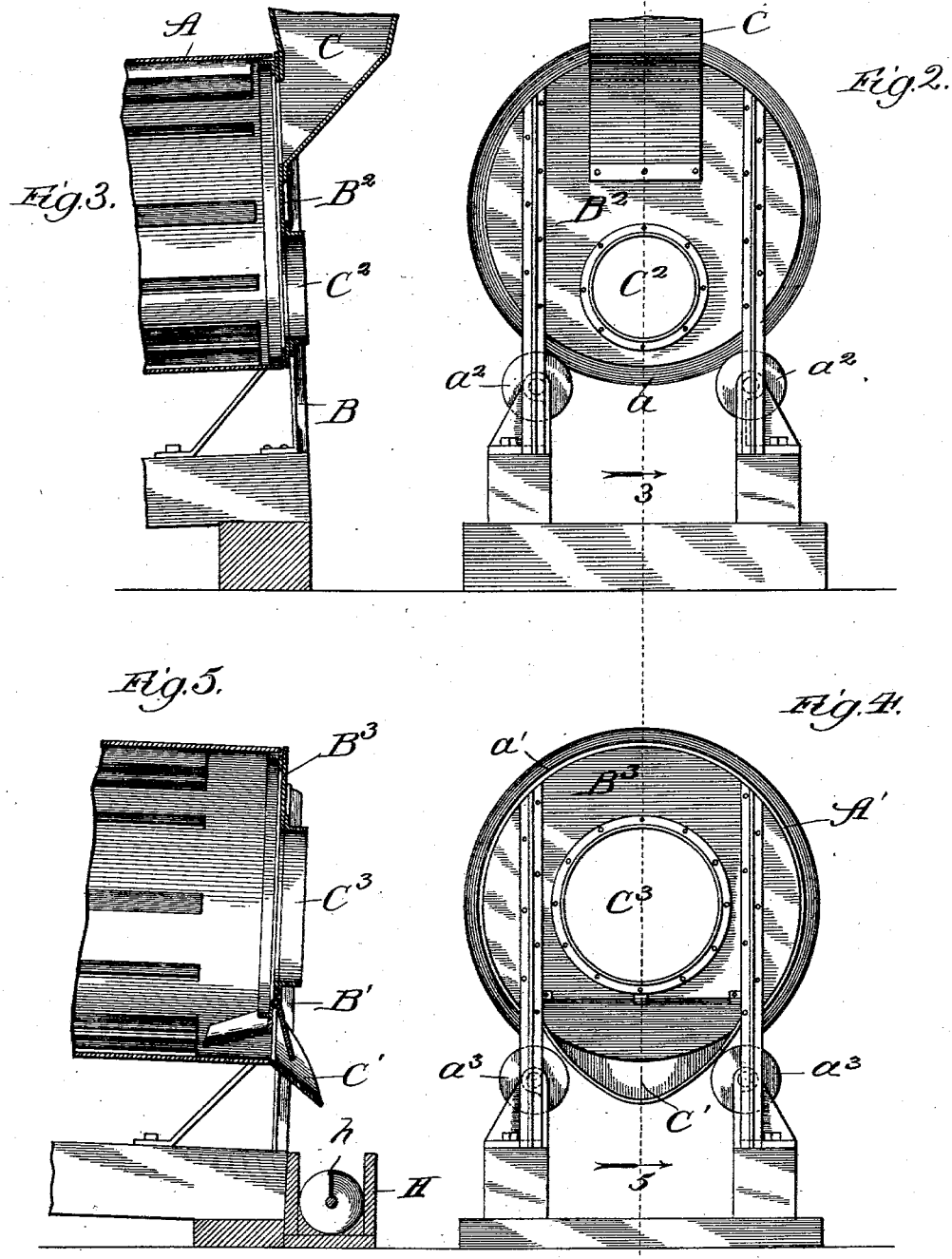

UNITED STATES PATENT OFFICE.

ALBERT G. MANNS AND CHARLES H. McDOWELL, OF CHICAGO, ILLINOIS.

DRIER.

SPECIFICATION forming part of Letters Patent No. 629,384, dated July 25, 1899.

Application filed November 3, 1898. Serial No. 695,396. (No model.)

*To all whom it may concern:*

Be it known that we, ALBERT G. MANNS and CHARLES H. McDOWELL, citizens of the United States, residing at Chicago, Illinois, have invented certain new and useful Improvements in Driers, of which the following is a specification.

The object of our invention is to make an apparatus in which the animal refuse or offal from packing and slaughtering houses can be dried, so that it can be converted into fertilizing material; and our invention consists in the features and details of construction hereinafter described and claimed.

In the drawings, Figure 1 represents a side elevation of our improved drier. Fig. 2 represents a front elevation of the upper cylinder. Fig. 3 is a sectional elevation in the line 3 of Fig. 2. Fig. 4 is a front elevation of the lower cylinder. Fig. 5 is a sectional elevation taken in the line 5 of Fig. 4. Fig. 6 is a front sectional view taken on line 6 of Fig. 1, and Fig. 7 is a rear sectional elevation taken in line 7 of Fig. 1.

In making our improved apparatus for drying the animal refuse or offal of slaughter and packing houses we make two cylinders A and A', arranged in different vertical planes, as illustrated in Fig. 1. These cylinders are supported on suitable floors or framework, as shown in the drawings, and they are preferably housed or inclosed and are arranged at an oppositely-directed angle or pitch. The upper cylinder inclines from the front to the rear end, while the lower cylinder inclines from the rear to the front end. In order to facilitate the rotation of the cylinders, they are provided with circumferential tracks $a$ and $a'$, which rest upon rolls $a^2$ and $a^3$. They are also provided with circumferential gear-teeth $A^2$ and $A^3$, which engage with the teeth of pinions $a^4$ and $a^5$, mounted on shafts rotated by pulleys $A^4$ and $A^5$, to which power may be applied through pulleys and belts or in any other desired way to effect their rotation. At the front ends of the cylinders are arranged supports B and B', which are bolted or otherwise fastened to the framework or foundation and properly braced to hold them securely in position. These supports sustain or carry the heads $B^2$ and $B^3$ of the cylinders and hold them in a stationary or non-rotative position. In the upper head is arranged a hopper C for the introduction of the material to be dried, while in the lower head is arranged a spout C' for the discharge of the material after it has been dried. In the upper head is a hole or opening $C^2$, and in the lower head is a hole or opening $C^3$, adapted to receive hot-air pipes $C^4$ and $C^5$, respectively. The hot air for these pipes is supplied by a furnace D, through which air is forced from a fan or blower D', which maintains the fire in the furnace and drives the heated air and gases through the pipes $C^4$ and $C^5$ into the cylinders A and A', respectively. The amount of air passing through these pipes may be regulated by dampers and the temperature of the air and gases passing through the pipe $C^5$ may be regulated by the admission of atmospheric air through the branch pipe $c$, so that the air admitted into the lower cylinder may be greatly reduced in temperature, as will be required by the nature of the work which it is to do. The cylinders are provided with longitudinal flights, shelves, or brackets D, D', and $D^2$. (Clearly illustrated in Figs. 6 and 7.) These shelves or flights are made in three different ways, or, rather, of three different forms. The flights or shelves D are made with a base-flange to attach it in place and a portion extending out into the cylinder at substantially right angles to the inner surface of the cylinder. The shelves or flights D' are made with a base-flange to attach it in place and a portion extending out into the cylinder at substantially an angle of forty-five degrees to the inner surface of the cylinder. The shelves or flights $D^2$ are made with a base-flange to attach it in place and a portion extending out into the cylinder at substantially right angles to the inner surface of the cylinder and a portion turned up at substantially right angles thereto. These various forms of flights or ledges will be readily understood from an examination of the drawings. They are made in these different forms so that they will pick up and carry quantities of the material being treated and retain the same until they have passed to different positions in their revolution. Thus the flight D' will carry the material farther around than the flight D, and the flight $D^2$ will carry the material farther than the flight D'. This prevents the material from being discharged back to the bottom of the cylinder at the same place as would be the case if the flights were all made of the same shape and had the same retaining capacity. We are thus enabled to secure a more complete and perfect distribution of the material over the bottom of the cylinder and at the same time sift it down in a thinner and more diffused state than if we made the flights all of the same shape. The material discharged from the rear end of the upper cylinder is directed by a chute or hopper E into the rear end of the lower cylinder. Both cylinders are made open at their rear ends, and fans F and F' draw the steam, moisture, and vapors caused by the heating and drying of the material out into a flue G, which carries them up and discharges them into the atmosphere. These fans may be rotated through pulleys $f$ and $f'$ in any desired way, but preferably by belts connected with suitable power. As the material is discharged it falls into a trough H, where a screw conveyer $h$ is arranged to carry it away to a desired place.

In operation the wet animal refuse and offal are discharged into the front end of the upper of the revolving cylinders. As it passes in it comes into contact with the stream or current of heated air and gases entering through the pipe $C^4$. Thus the material to be treated in its condition of greatest moisture is brought directly into contact with the air and gases in their condition of greatest heat. The material is caught up by the flights or shelves as the cylinder rotates and dropped back again to the bottom from different positions, so that it is kept spread or distributed over the bottom of the cylinder. The inclination of the cylinder causes the material to travel toward the rear end as new material is introduced at the front end. The steam and vapors expelled from the material being treated by the heat of the air and gases are drawn out by the suction of the fan F and not allowed to remain in the cylinder in contact with the material being dried. By the time the material reaches the rear end of the upper cylinder it has had a large portion of the moisture eliminated and removed. It is then discharged into the chute E, whence it passes into the rear end of the lower cylinder. Here the same operation of the shelves or flights takes place as already described, so that the material is constantly picked up and distributed in a thinned or diffused condition. A suction-fan F' draws off the moisture and vapors caused by the heated air and gases in the lower cylinder, so that as the material advances toward the front end it becomes drier and drier until by the time it reaches the front end it is entirely dry and in the condition desired. As the material becomes freed from moisture it is desirable that the air and gases brought into contact with it should be of less heat or temperature than where they are brought into contact with the material in its wet and green condition, as first presented. The temperature of the air and gases admitted is therefore reduced as much as desired, so that they will be able to complete the drying without burning or injuring the material.

What we regard as new, and desire to secure by Letters Patent, is—

1. The combination, in a drier, of an upper rotatable cylinder having a downward inclination in the direction of its discharge end, an open discharge end for the cylinder a stationary head at the receiving end of the cylinder around which the cylinder revolves, a hopper for the material to be dried communicating through the stationary head with the receiving end of the cylinder, means for introducing through the stationary head a hot blast in a condition of highest temperature directly against the material as it enters the cylinder from the hopper when the material is in its condition of greatest greenness and moisture at the receiving end of the cylinder, a lower rotatable cylinder located in line with and having its receiving end at the discharge end of the upper cylinder and having a downward inclination in the direction of its discharge end, an open receiving end for such cylinder, a stationary head at the discharge end of such cylinder around which the cylinder revolves, a chute leading from the discharge end of the upper cylinder into the receiving end of the lower cylinder transferring the material from one cylinder to the other, an outlet for the dried material through the stationary head at the discharge end of the lower cylinder, and means for introducing a blast of diminished temperature through the stationary head into the discharge end of the lower cylinder to pass through such cylinder, substantially as described.

2. The combination, in a drier, of an upper rotatable cylinder having a downward inclination in the direction of its discharge end, an open discharge end for the cylinder a stationary head at the receiving end of the cylinder around which the cylinder revolves, a hopper for the material to be dried communicating through the stationary head with the receiving end of the cylinder, means for introducing a hot blast in the condition of highest temperature directly against the material as it enters the cylinder from the hopper at the receiving end of the cylinder when the material is in its condition of greatest greenness and moisture, a lower rotatable cylinder in line with and having its receiving end at the discharge end of the upper cylinder and having a downward inclination in the direction of its discharge end, an open receiving end for such cylinder, a stationary head at the discharge end of such cylinder around which the cylinder revolves, a chute leading from the discharge end of the upper cylinder into the receiving end of the lower cylinder transferring the material from one cylinder to the other, an outlet from the stationary head for the discharge of the dried material at the discharge end of the lower cylinder, means for introducing a blast of diminished temperature into the discharge end of the lower cylinder, and means for drawing off steam, vapor and moisture from the upper cylinder at the open discharge end and from the lower cylinder at the open receiving end, substantially as described.

3. The combination, in a drier, of an upper rotatable cylinder having a downward inclination in the direction of the discharge end, an open discharge end for the cylinder a stationary head at the receiving end of the cylinder around which the cylinder revolves, a hopper for the material to be dried communicating through the stationary head with the receiving end of the cylinder, a hot-air pipe entered into and terminating at the inner line of the head for the receiving end of the cylinder and communicating with a furnace for projecting a blast of hot air in a condition of highest temperature directly against the material as it is discharged from the hopper when the material is in its condition of greatest greenness and moisture at the receiving end of the cylinder, a lower rotatable cylinder in line with and having its receiving end at the discharge end of the upper cylinder and having a downward inclination in the direction of its discharge end, an open receiving end for such cylinder a stationary head at the discharge end of such cylinder around which the cylinder revolves, a chute leading from the discharge end of the upper cylinder into the receiving end of the lower cylinder transferring the material from one cylinder to the other, an outlet through the stationary head at the discharge end of the lower cylinder for the dried material, and a hot-air pipe entering into and terminating at the inner line of the head for the discharge end of the cylinder and communicating with a furnace for projecting a blast of diminished temperature into the discharge end of the lower cylinder to complete the drying of the material with the passage of the blast through such cylinder, substantially as described.

4. The combination, in a drier, of an upper rotatable cylinder having a downward inclination in the direction of its discharge end, an open discharge end for the cylinder a stationary head at the receiving end of the cylinder around which the cylinder revolves, a hopper for the material to be dried communicating through the stationary head with the receiving end of the cylinder, a hot-air pipe entered into and terminating at the inner line of the head for the receiving end of the cylinder and communicating with a furnace for projecting a blast of hot air in a condition of highest temperature directly against the material as it is discharged from the hopper at the receiving end of the cylinder when the material is in its condition of greatest greenness and moisture, a suction-fan located in line with the open discharge end of the cylinder for withdrawing steam, vapor and moisture from the cylinder, a lower rotatable cylinder in line with and having its receiving end at the discharge end of the upper cylinder and having a downward inclination in the direction of its discharge end, an open discharge end for such cylinder a stationary head at the discharge end of such cylinder around which the cylinder revolves, a chute leading from the discharge end of the upper cylinder into the open receiving end of the lower cylinder transferring the material from one cylinder to the other, an outlet for the dried material through the stationary head at the discharge end of the lower cylinder, a hot-air pipe entered into and terminating at the inner line of the head for the discharge end of the cylinder and communicating with a furnace for projecting a blast of diminished temperature into the discharge end of the lower cylinder to complete the drying of the material in such cylinder and a suction-fan located in line with the receiving end of the lower cylinder for withdrawing steam, vapor, and moisture from such cylinder, substantially as described.

ALBERT G. MANNS.
CHARLES H. McDOWELL.

Witnesses:
A. R. URION,
T. C. STURNER.